P. MAKOWSKI.
WASHING MACHINE.
APPLICATION FILED APR. 21, 1922.

1,436,718.

Patented Nov. 28, 1922.

Witnesses:-
Hyman Berman
Lawrence Schlosser

INVENTOR.
Peter Makowski,
BY
Clarence A. O'Brien
ATTORNEY.

P. MAKOWSKI.
WASHING MACHINE.
APPLICATION FILED APR. 21, 1922.

1,436,718.

Patented Nov. 28, 1922.
9 SHEETS—SHEET 2.

Witnesses:-
Hyman Berman
Lawrence Schlosser

INVENTOR.
Peter Makowski,
BY
Clarence A. O'Brien
ATTORNEY.

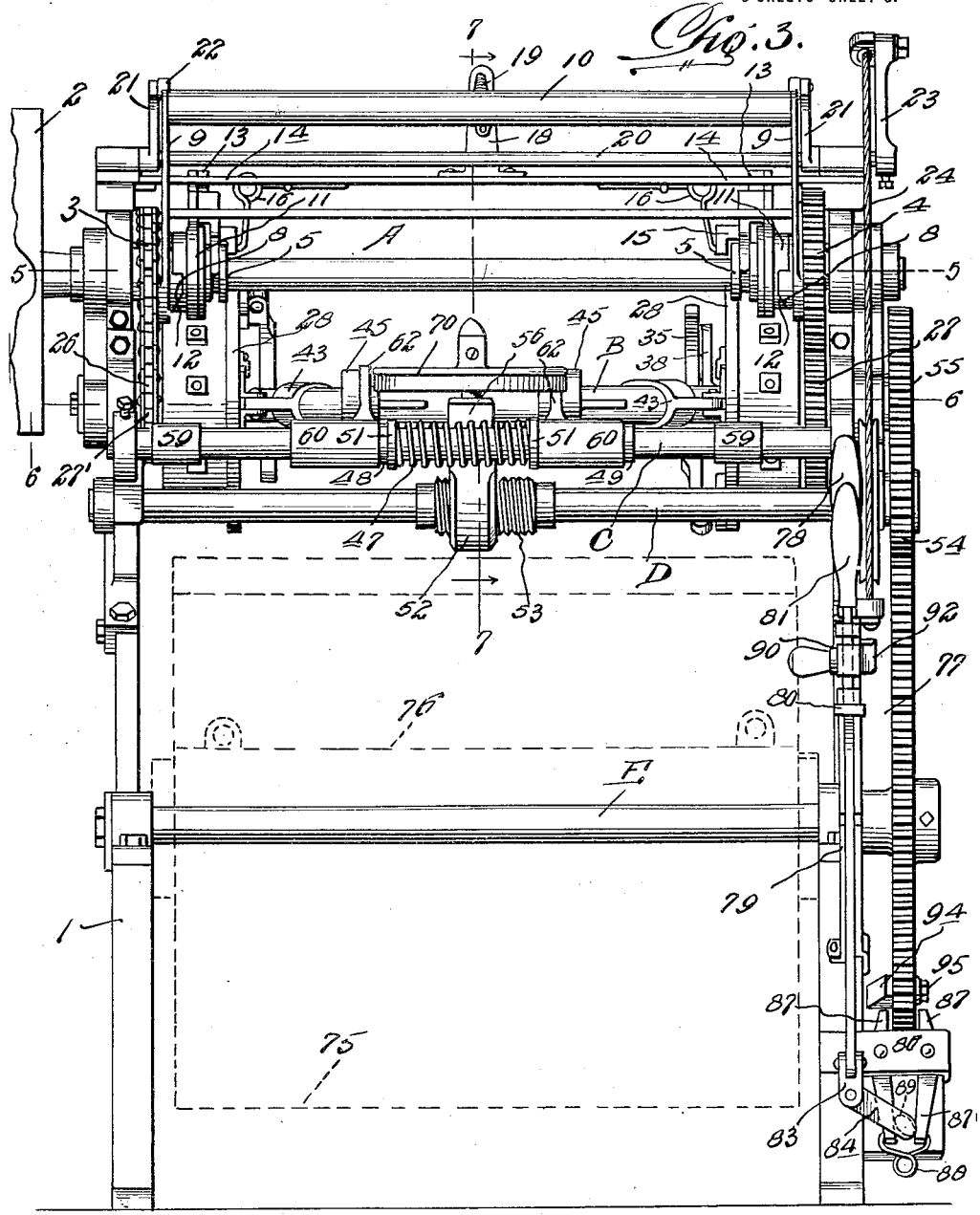

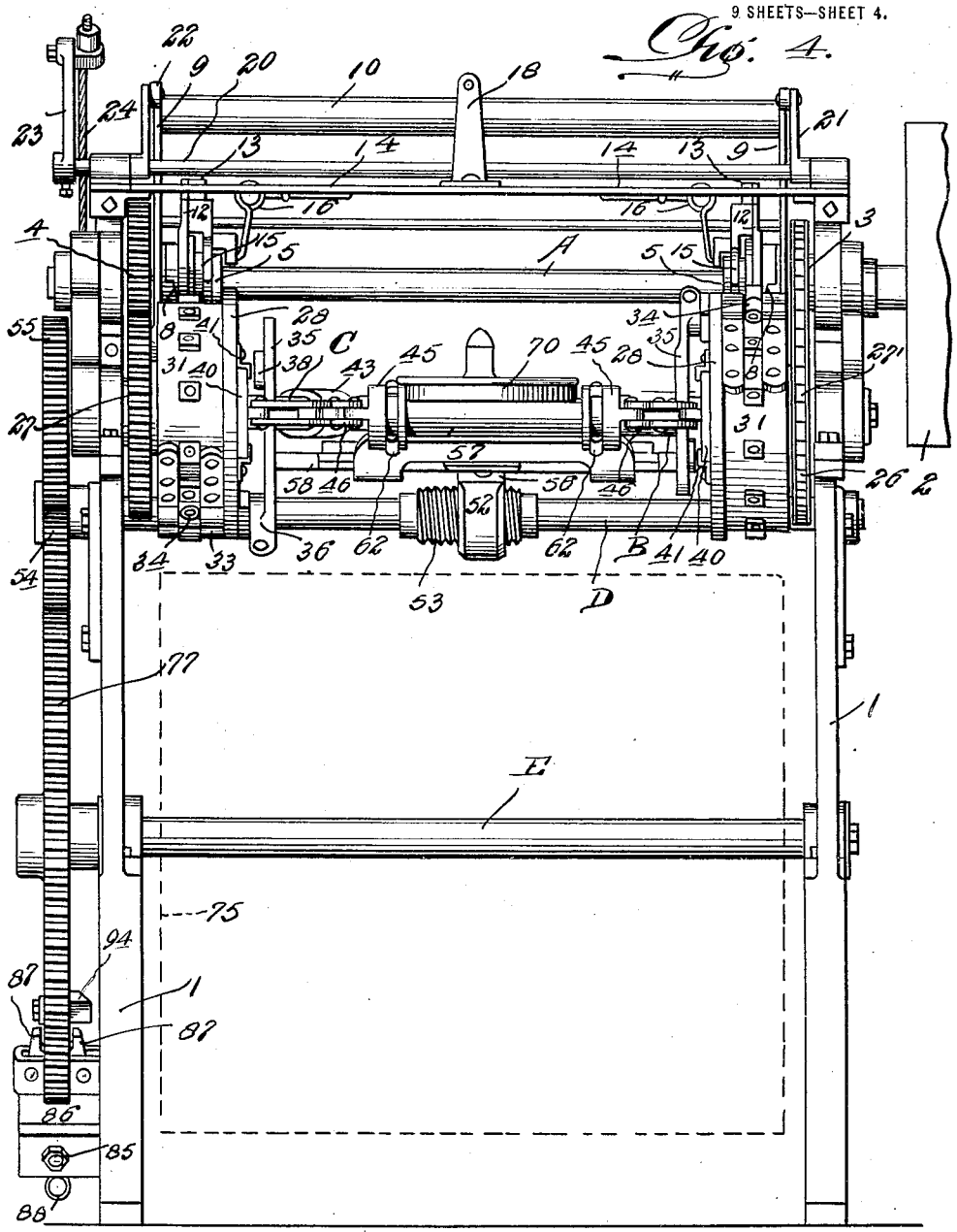

P. MAKOWSKI.
WASHING MACHINE.
APPLICATION FILED APR. 21, 1922.
1,436,718.
Patented Nov. 28, 1922.
9 SHEETS—SHEET 5.
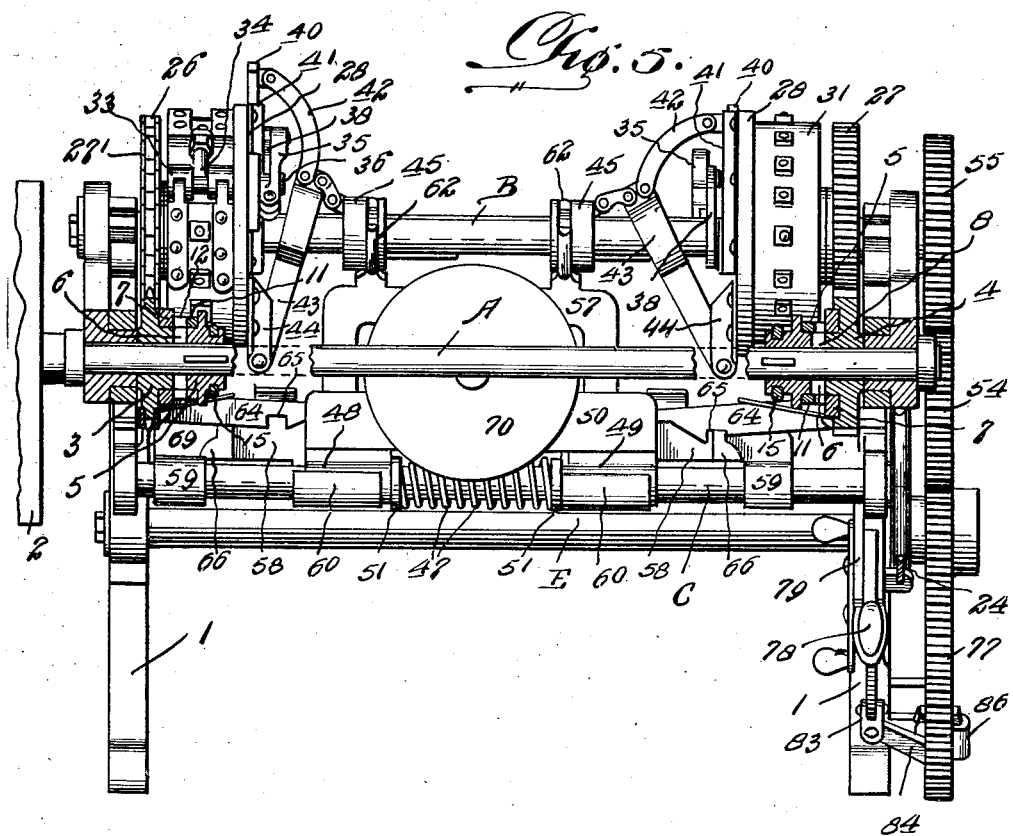
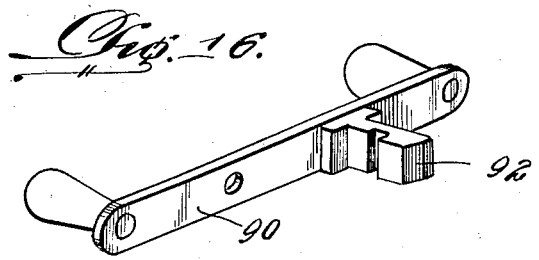
Witnesses:-
Hyman Berman
Lawrence Schlosser
INVENTOR.
Peter Makowski,
BY
Clarence A. O'Brien
ATTORNEY.

P. MAKOWSKI.
WASHING MACHINE.
APPLICATION FILED APR. 21, 1922.
1,436,718.
Patented Nov. 28, 1922.
9 SHEETS—SHEET 6.
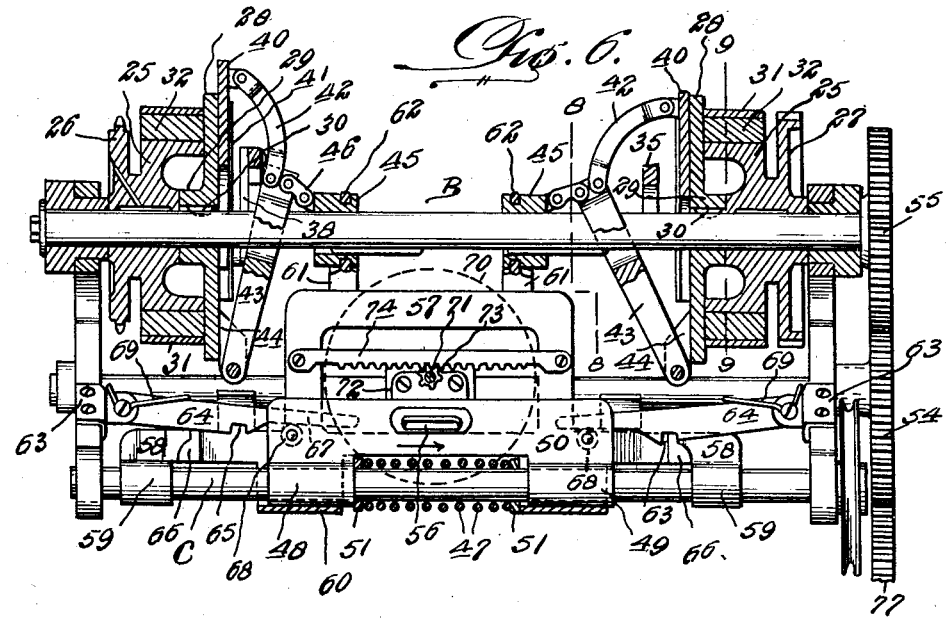
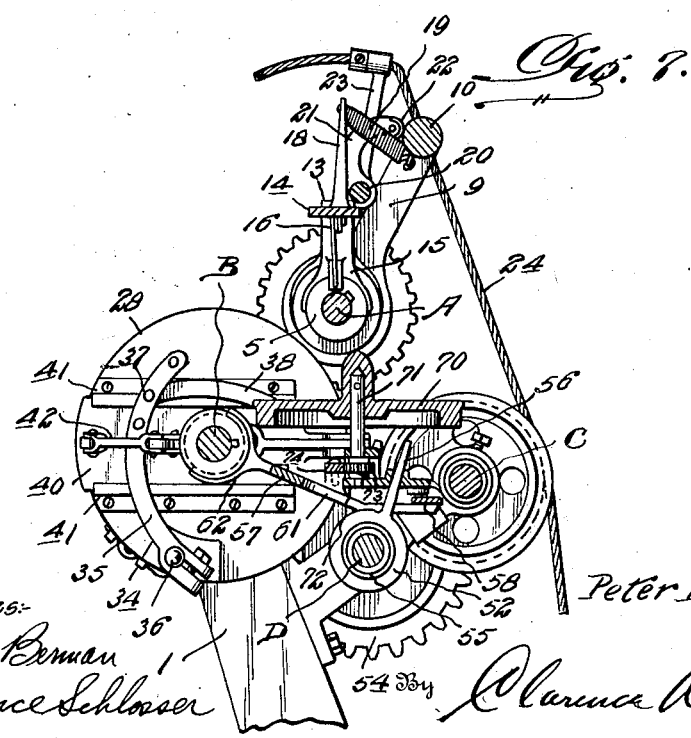
Witnesses:-
Inventor
Peter Makowski,
By
Attorney

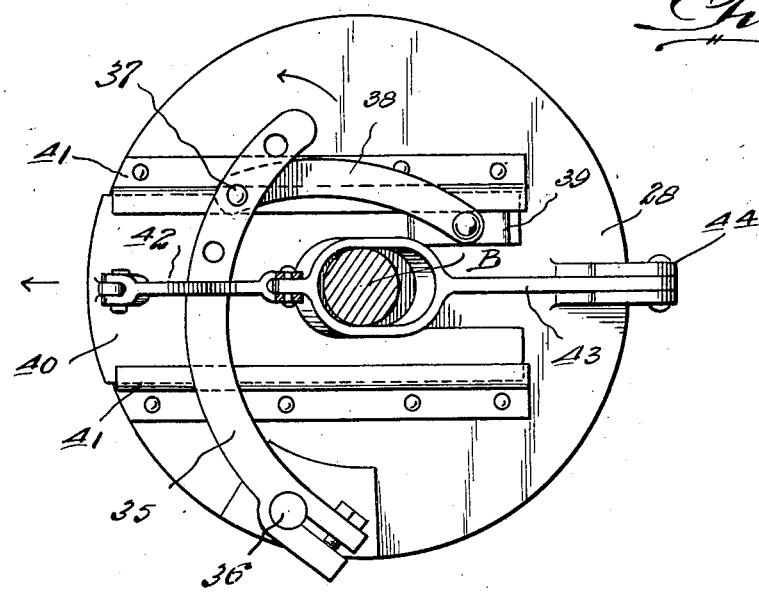
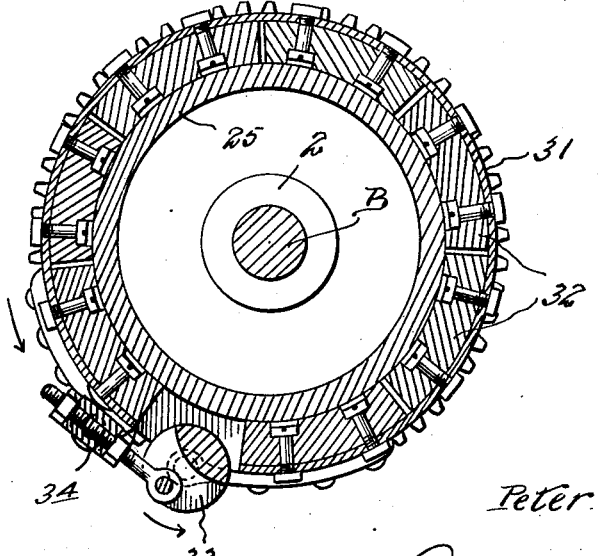

P. MAKOWSKI.
WASHING MACHINE.
APPLICATION FILED APR. 21, 1922.

1,436,718.

Patented Nov. 28, 1922.
9 SHEETS—SHEET 8.

Witnesses:—

Inventor
Peter Makowski,
By Clarence A. O'Brien
Attorney

P. MAKOWSKI.
WASHING MACHINE.
APPLICATION FILED APR. 21, 1922.
1,436,718.
Patented Nov. 28, 1922.
9 SHEETS—SHEET 9.
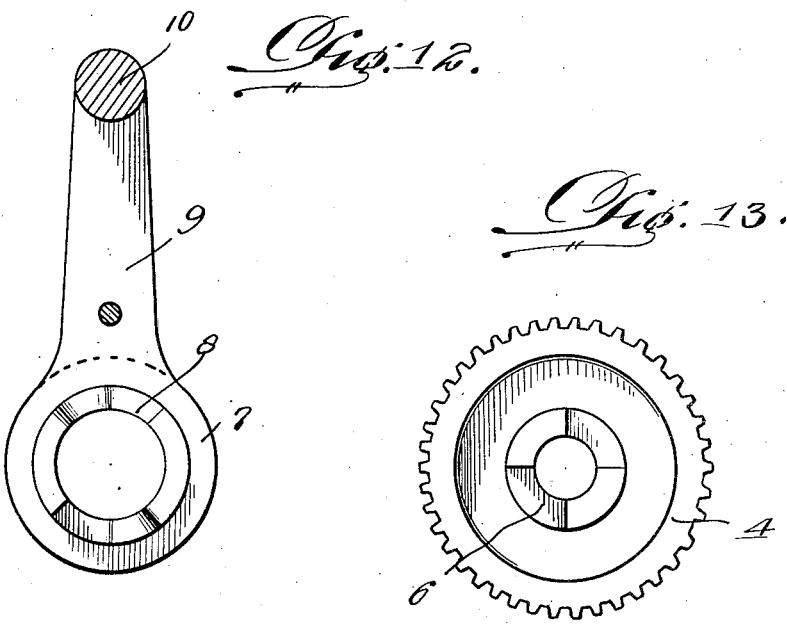
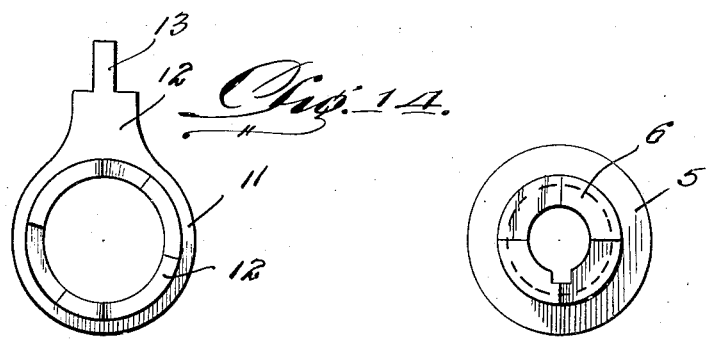
Witnesses:-
Hyman Berman
Lawrence Schlosser
Inventor
Peter Makowski,
By Clarence A. O'Brien
Attorney Patented Nov. 28, 1922.

1,436,718

UNITED STATES PATENT OFFICE.

PETER MAKOWSKI, OF CHICAGO, ILLINOIS.

WASHING MACHINE.

Application filed April 21, 1922. Serial No. 555,830.

*To all whom it may concern:*

Be it known that I, PETER MAKOWSKI, a citizen of the United States, residing at Chicago, in the county of Cook and State of Illinois, have invented new and useful Improvements in Washing Machines, of which the following is a specification.

In carrying out the present invention it is my purpose to provide a washing machine wherein the drum that carries the garments or other material to be washed may be rotated in relatively reverse directions for predetermined periods, wherein this reverse rotation of the drum will be taken care of automatically, and wherein the rotation of the drum may be controlled automatically or manually according to the wishes of the operator or attendant in charge of the washing machine.

It is also my purpose to provide a washing machine wherein the rotation of the drum may be stopped automatically and instantaneously when desired, and wherein the automatic stopping mechanism will be so arranged and constructed as to stop the drum at a point where the cover or door is convenient and immediately available to the attendant or operator in charge of the machine, thereby enabling the attendant to open the door quickly in order to remove the contents of the drum or to deliver the material to be washed to the drum.

Furthermore, I aim to provide a washing machine which may be driven from a line shaft or other source of power and which may be cut into and out of service without disturbing the line shaft or source of power so that other machines connected with the line shaft or source of power may continue to operate, and wherein the entire operating mechanism of the machine will be cut out of service when the drum is stopped, thereby preventing waste of power and enabling the line shaft or source of power to operate the other machines independently of the operation of the particular machine that it is desired to cut out of service.

A further object of my invention is the provision of a washing machine wherein the component parts will be so arranged and correlated as to reduce the possibility of derangement to a minimum and which will be constructed in such manner that access may be had to any of the parts of the machine whenever it is necessary to replace or repair such parts.

With the above recited objects in view, and others of a similar nature which will appear as the nature of the invention is more fully understood, the invention resides in the construction, combination and arrangement of parts set forth in and falling within the scope of the appended claims.

In the accompanying drawings:

Figure 3 is a front elevation of my improved washing machine.

Figure 4 is a rear elevation of the same.

Figure 5 is a top plan view of the machine, parts being shown in section.

Figure 6 is a horizontal sectional view on the line 6—6 of Figure 3.

Figure 7 is a vertical sectional view on the line 7—7 of Figure 3.

Figure 8 is an enlarged sectional view on the line 8—8 of Figure 6.

Figure 9 is a similar view on the line 9—9 of Figure 6.

Figure 12 is a side elevation of one of the clutch throw-out cams.

Figure 13 is a side elevation of one of the clutch members.

Figure 14 is a side elevation of the clutch throw-out cam that cooperates with the cam shown in Figure 12.

Figure 15 is a side elevation of the clutch section that cooperates with the clutch member or section shown in Figure 13.

Figure 16 is an enlarged perspective view of the lever for controlling the automatic stopping of the machine.

Figure 1:
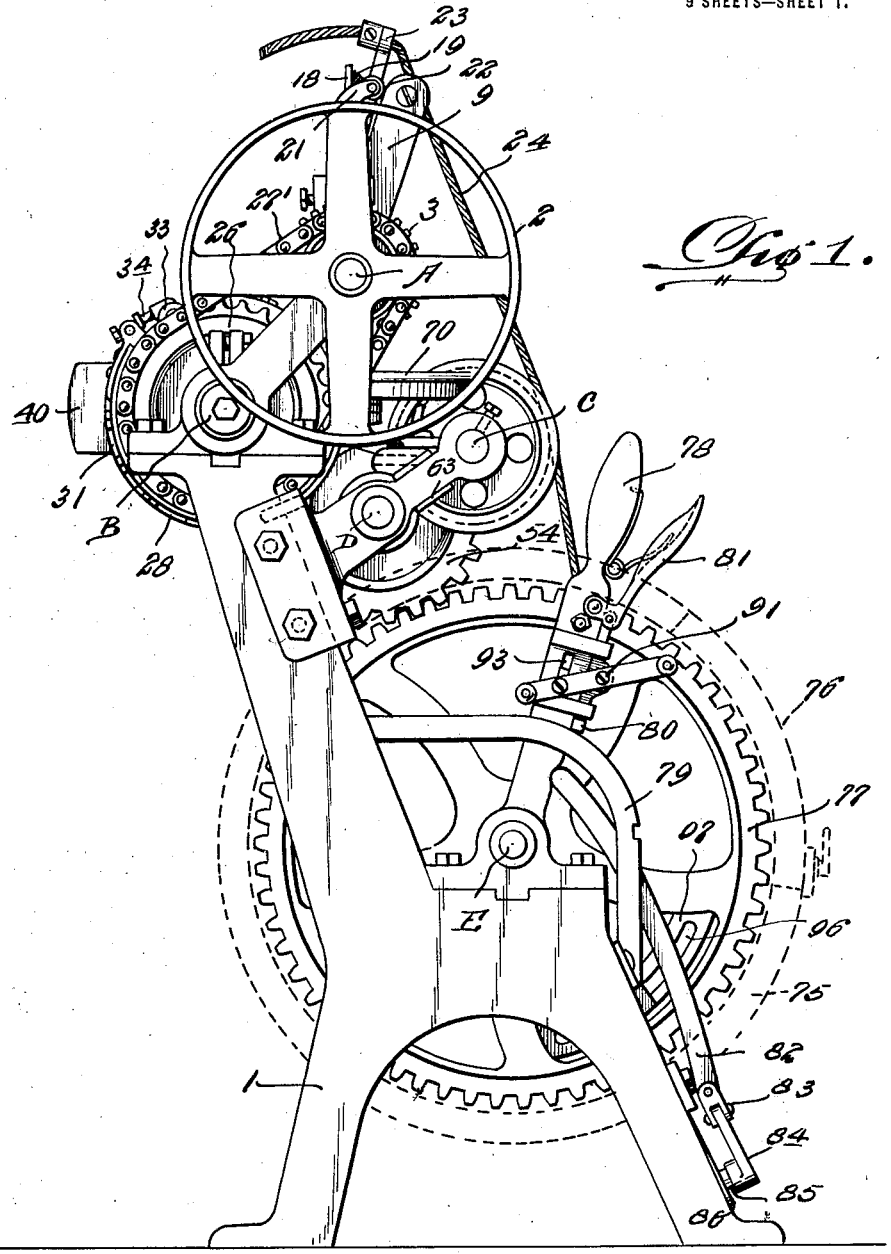
Figure 1 is a view in side elevation of a washing machine constructed in accordance with my invention.

Referring now to the drawings in detail, 1 designates the main or supporting frame of my improved washing machine, this frame being of suitable and substantial construction, in order to support the various parts of my machine to hold the same properly assembled.

Journaled in the upper end of the main frame 1 for rotation therein is a main drive shaft A, on one end of which is fixed a belt pulley 2 designed to be belted up to a line shaft, so that the shaft A may be rotated. It is conceivable, however, that other means may be employed for driving the shaft A, if desired. Loosely mounted upon the shaft A adjacent to one side of the frame is a sprocket wheel 3, while similarly mounted upon the shaft A adjacent to the other side of the frame is a pinion 4 and splined upon the shaft A adjacent to the inner sides of the sprocket wheel and pinion are clutch members 5—5. The confronting faces of the sprocket wheel 3 and the adjacent clutch member 5 and the confronting surfaces of the pinion 4 and adjacent clutch member 5 are formed with clutch teeth 6 adapted for interlocking engagement, so that motion may be transmitted from the shaft A to the sprocket wheel 3 or to the pinion 4, according to which set of clutch teeth are in interlocking engagement, as is described more fully hereafter.

Surrounding the hub portions of the sprocket wheel 3 and the pinion 4 formed with clutch teeth 6 are collars 7, the inner faces of which are formed with cam surfaces 8. These collars 7 are capable of rotation about the respective hubs and are formed respectively with radial arms 9 that are interconnected by means of a cross bar 10 by which the collar 7 may be rotated about the respective hubs whenever desired. Surrounding the toothed portions of the clutch members 5 and held against lateral movement on such clutch members are collars 11, respectively, formed with radial arms 12 terminating in lugs 13 engageable in slots formed in a cross bar 14 extending across the frame 1 and suitably secured thereto, the lugs 13 in the slots in the bar 14 serving to hold the collars 11 against rotation on the respective clutch members. The faces of the collars 11 that confront the cam surfaces 8 on the collar 7 are formed with cam surfaces 12 that cooperate with the cam surfaces on the respective collars 7. By means of this construction it will be seen that when the cam collars 7 are rotated in one direction the cam surfaces 8 riding on the cam surfaces 12 of the collars 11 will impart lateral motion to the collars 11, thereby sliding the clutch members 5 along the shaft to disengage the clutch teeth 6, so that the shaft A may be revolved freely without transmitting motion to the sprocket wheel 3 and gear or pinion 4. When, however, the collars 7 are operated in the reverse direction the clutch teeth 6 engage each other and motion is thereby transmitted from the shaft A to the sprocket wheel and pinion.

In the present instance the inner end portions of the clutch members 5 are engaged by yokes 15 that extend upwardly and are under the influence of springs 16 that act normally to urge the clutch members into clutching position and restore the clutch members to clutching position upon the movement of the collars 7 in one direction, as previously described. These springs 16 are suitably secured to a cross bar 17 that is appropriately fastened to the main frame 1 at the top of the latter, and upstanding from the cross bar 17 is a plate 18 to which is fastened one end of a spring 19, the other end of the spring being fastened to the cross bar 10 so as to restore the latter and the collars 7 to clutching position upon the release of the cross bar 10.

The arms 9 are also under the control of a rock shaft 20 that is journaled in suitable bearings carried by the upper end of the frame 1 and fixed to the rock shaft 20 are curved arms 21 provided at their outer ends with rollers 22 that engage the arms 9, so that when the shaft 20 is rocked in one direction motion will be imparted to the arms 9 to rotate the collars 7 to unclutch or disconnect the sprocket wheel 3 and pinion 4 from the shaft A. When the shaft 20 is rocked in the opposite direction, however, the arms 9 are relieved of the influence of the rollers 22 and the spring 19 re-acts to restore the parts to clutching position so that the sprocket wheel and pinion will be again clutched to the shaft A. On one end of the rock shaft 20 is secured an arm 23, and appropriately fastened to the outer end of the arm 23 is one end of a cable 24 by which motion may be imparted to the rock shaft 20 to operate the arms 9 to unclutching position, as previously described.

In the form of my invention selected for the purpose of illustration my improved reversing mechanism comprises a shaft B journaled in the frame 1 parallel with the shaft A. Mounted loosely on the shaft B are drums 25 disposed adjacent to the respective ends of the shaft B. Also loosely mounted upon the shaft B at the outer sides of the drums 25 respectively are sprocket and gear wheels 26 and 27 corresponding with the sprocket 3 and pinion 4. The sprocket 26 is connected to the sprocket 3 by a chain 27′ so that the sprocket 26 will be driven in the same direction as the sprocket 3, while the gear 27 meshes with the pinion 4 whereby the gear will be rotated in a direction reverse to that of the pinion 4. The drums 25 are connected with the sprocket 26 and gear 27 respectively so as to rotate therewith. Each drum 25 is adapted to be clutched to and unclutched from the shaft B, so that the latter may be rotated in one direction or the other, according to which drum is connected with the shaft B.

Each clutching mechanism includes one of the drums 25 and a disk 28 arranged concentrically of the shaft B and formed with a hub 29 splined as at 30 to the shaft B, the disk being arranged adjacent to the inner side of the companion drum 25. Encircling the drum 25 is a split band 31 carrying on its inner side shoes 32 designed to grip the drum 25 when the band 31 is contracted and to release the drum when the band is expanded. One end of the band 31 is connected to a barrel 33 at the axis of the latter and the other end of the band is connected to the band eccentrically thereof through the medium of an adjusting bolt 34, as shown in Figure 9. The barrel is connected at its axis with the disk 28 and is rotatable about such axis. By means of this construction it will be seen that when the barrel 33 is rotated in one direction the band will be contracted while when the barrel is rotated in the reverse direction the band will be expanded.

In the present instance the barrel 33 of each clutch mechanism is rotated by an arm 35 one end of which is connected to the axis of the drum as at 36, while the other end is adjustably pinned as at 37 with one end of a link 38, the other end of which is pivoted to a block 39 fixed to a plate 40 mounted for sliding movement within guides 41 secured to the adjacent face of the disk 28, as clearly shown in Figure 8. When the plate 40 is moved radially of the disk 28 in the direction of the arrow in Figure 8 a swinging motion is imparted to the arm 35 through the block 39 and link 38, thereby rotating the barrel 33 in a direction to contract the band 31, as shown by the arrows in Figure 9, thus connecting the particular drum 25 to the shaft B to rotate the latter.

The outer end of each plate 40 is connected with one end of a link 42 and the other end of the link 42 is connected with one end of a lever 43, the other end of the lever 43 being pivoted to a bracket 44 carried by the disk 28 at a point diametrically opposite the connection between the plate 40 and link 42, as shown in Figure 8. Also splined on the shaft B are throw collars 45 connected with the levers 43 respectively by links 46 so that when each collar 45 is moved along the shaft B in one direction the corresponding plate 40 will be moved to contract the band 31 while when the collar is moved in the reverse direction the band will be expanded.

The clutch mechanism of the gear 27 is designed to connect said gear with the shaft B when the clutch mechanism of the sprocket wheel 26 is in inactive or declutching position and the sprocket wheel disconnected from the shaft and vice versa, thereby enabling the shaft B to be driven in reverse directions alternately from the shaft A when the clutches of the sprocket wheel 3 and pinion 4 are in active or clutching position, as previously described.

Figure 2:
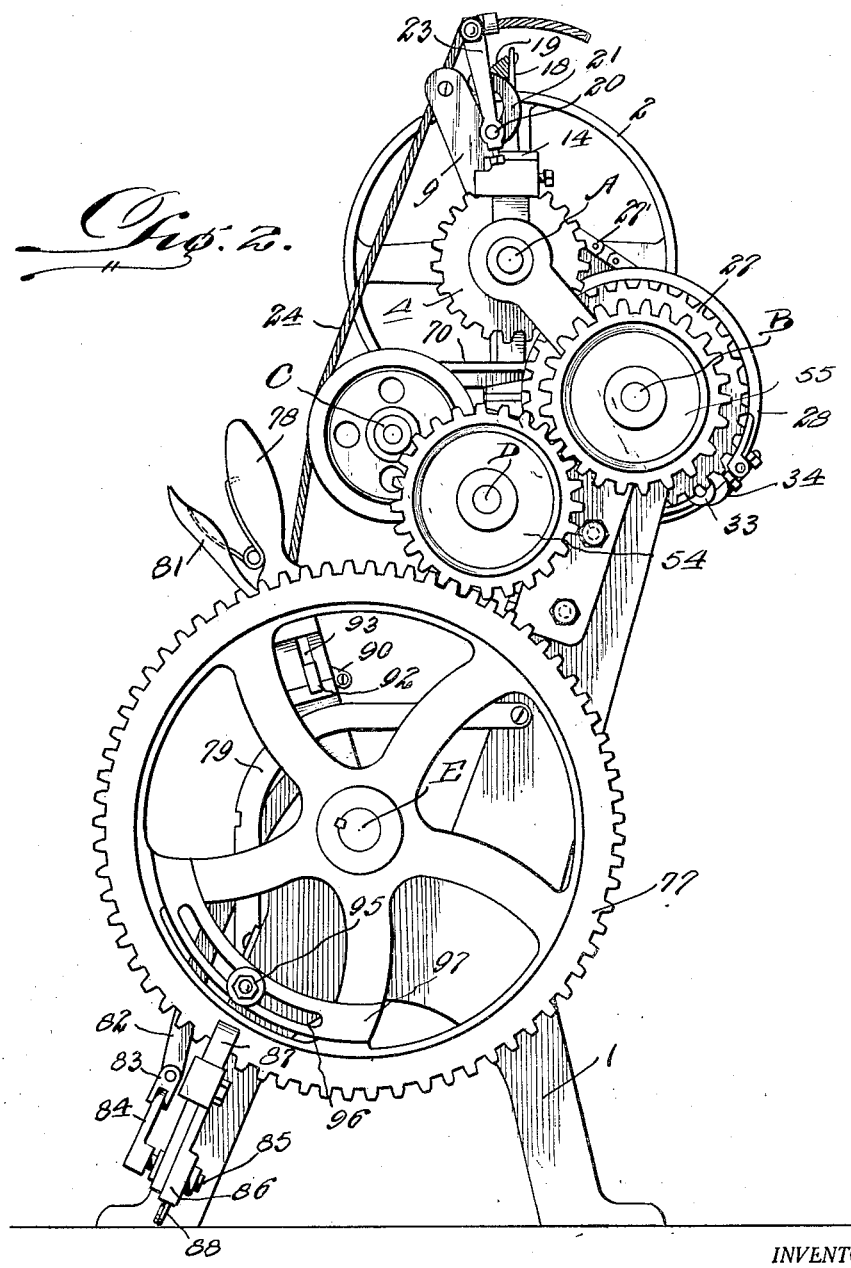
Figure 2 is a similar view showing the other side of the machine.
Figure 10:
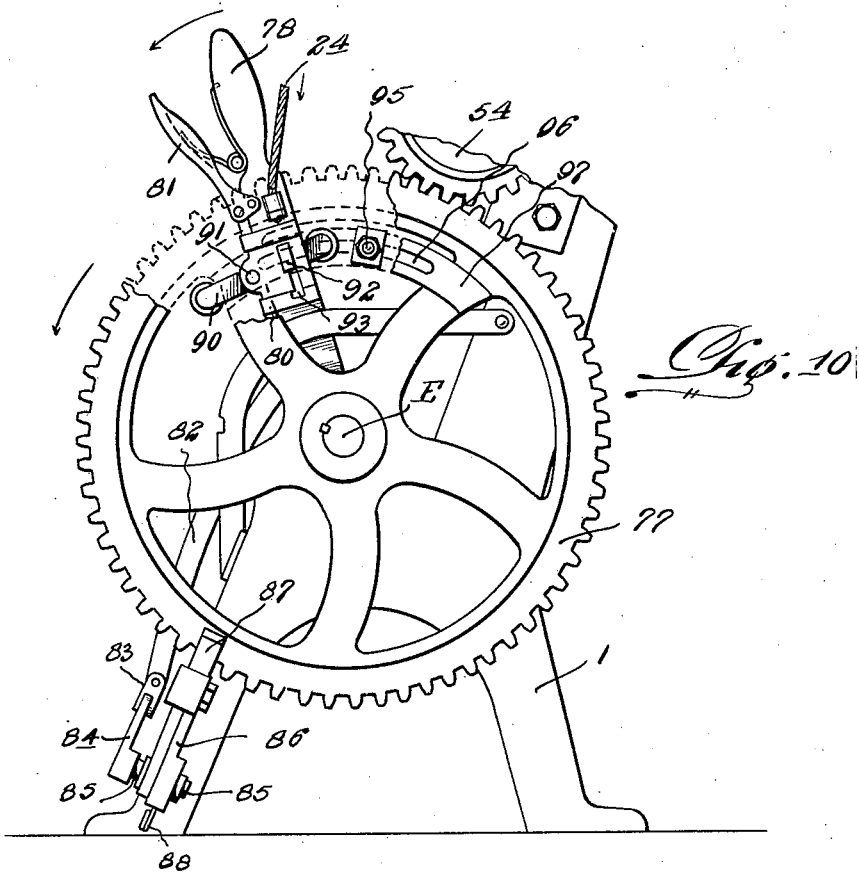
Figure 10 is an enlarged fragmentary side elevation, parts being broken away, showing the automatic control for the stopping of the machine.
Figure 11:
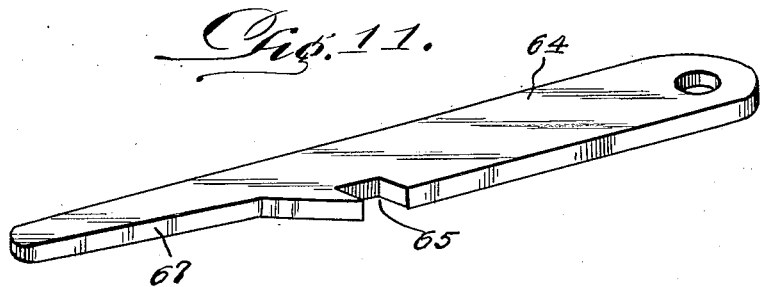
Figure 11 is an enlarged perspective view of one of the latch members used in connection with the controlling means for the reverse mechanism.

In order to bring about this alternate operation of the clutch devices of the sprocket 26 and gear 27 I employ a clutch shifting mechanism which in the present form of my invention is constructed as follows:

A shaft C is fixed in the frame 1 in advance of the shaft B and encircling the shaft C at the center thereof is a compression spring 47. At the ends of the compression spring 47 are compressing sleeves 48 and 49 connected to each other for simultaneous movement by a plate 50 and adapted to compress the spring in one direction or the other according to the movement of the sleeves, washers 51 being arranged at the ends of the spring as shown in Figure 6. The travel of the plate 50 in one direction or the other is brought about by a worm nut 52 meshing with a worm 53 on a shaft D journaled in bearings carried by the frame 1 and equipped at one end with a pinion 54 meshing with a pinion 55 on the reversing shaft B, as clearly shown in Figure 2, the shaft D being disposed below and rearwardly of the fixed shaft C.

The worm nut 52 is formed with an upwardly extending finger 56 that is engaged in an opening in the plate 50 so as to impart movement to the plate in the travel of the nut 52 over the worm 53.

Arranged in a plane immediately below that of the plate 50 is a carriage 57 provided with laterally extending arms 58 formed with alining sleeves 59 that surround the fixed shaft C adjacent to the ends of the latter and are capable of sliding movement thereon. Formed on the carriage 57 at the inner ends of the arms 58 are spring engaging sleeves 60 that loosely surround the sleeves 48 and 49 and are designed to coact with the sleeves 48 and 49 to effect the compressing of the spring 47, as is hereinafter described. The carriage 57 is also provided with rearwardly extending arms 61 formed with yokes 62 that engage in annular grooves respectively formed in the clutch throw collars 45 so that as the carriage is shifted in one direction or the other the clutches will be rendered active and inactive respectively to reverse the motion of the shaft B.

Secured to the side members of the frame 1 are brackets 63 and pivoted to the brackets 63 are horizontally disposed latch bars 64 overlying the arms 58 respectively and formed with notches 65 engageable alternately with latching lugs 66 formed on the respective arms 58, as shown in Figures 5 and 6. The forward edges of the latch bars at the inner end portions thereof are inclined as at 67 and engage rollers 68 on the under side of the plate 50, while the rear edges of the latch bars are engaged by springs 69 carried by the brackets 63 and acting to urge the latch bars forward into latching position.

In practice, assuming the sprocket 26 clutched to the shaft B and the gear 27 disconnected from such shaft as in Figures 5 and 6 and the carriage 57 held in the position shown by the latch bar 64 and lug 66 at the right in Figures 5 and 6, the clutch shifting mechanism will operate as follows: In the rotation of shaft B under sprocket 26 motion is transmitted to worm shaft D through pinions 55 and 54 and worm 53 moves nut 52 to the right. This draws plate 50 to the right as indicated by arrow in Figure 6, thereby sliding sleeves 48 and 49 to right, while the carriage 57 is held stationary by the active latch bar. The sleeve 48 compresses the spring 47 against the remote spring engaging sleeve 60 on the carriage, thereby storing power in the compression spring. In this movement of the plate 50 the roller 68 in engagement with the active latch bar is riding on the inclined edge portion of such bar with the result that when the plate 50 reaches the end of its path of travel the active latch bar is swung out of engagement with the lug 66 against the action of the spring 69 and when the carriage is thus released the compression spring 47 reacts and shifts the carriage with the result that the throw collars 45 are shifted along the shaft B to disengage the clutch of sprocket wheel 26 and engage the clutch of gear wheel 27. Thus the direction of movement of shaft B is automatically reversed. Necessarily the direction of motion of shaft D is reversed and the worm and nut shift the plate 50 so that the compressing sleeve 49 will act to compress the spring 47 against the remote spring engaging sleeve 60 on the carriage, the latch bar 64 at the left in Figure 6 now engaging its lug 66 to hold the carriage against shifting until the proper time and in the continued travel of the plate 50 under these conditions the just described cycle of operations will be repeated. Thus the direction of movement of the shaft B is alternately reversed automatically.

I also employ shock absorbing means for preventing the too rapid shifting of the carriage 57. In the present instance this comprises a horizontally disposed wheel 70, preferably weighted, fixed on the upper end of a vertical shaft 71 journaled in suitable bearings carried by an extension 72 on the rear edge of the plate 50 and equipped adjacent to its lower end with a pinion 73 meshing with a rack bar 74 secured to the carriage 57. The inertia of the wheel 70 must be overcome when the spring 47 is released and this inertia acts to prevent the too sudden shifting of the carriage under the action of the compression spring.

Journaled in appropriate bearings carried by the lower portion of the frame 1 is a horizontal shaft E upon which is fixed a suitably constructed washing drum 75 (shown in dotted lines in Figures 1, 3 and 4) provided with a cover plate 76 through which access may be had to the interior of the drum to place the material to be washed therein and to remove the contents thereof. One end of this shaft E is provided with a large gear wheel 77 that meshes with the pinion 54 on the shaft D so that the shaft E and washing drum thereon will be rotated alternately in reverse directions for predetermined periods in order to insure the proper cleansing of the contents of the drum.

In addition to the bar 10 for manual operation to throw the power off the shaft B I employ a combined throw off and brake operating lever 78 that is fulcrumed upon the shaft E at one side of the drum 75 and is movable over a notched bar 79 and equipped with a holding dog 80 engageable in the notched bar 79 to hold the lever 78 in throw off and braking position, the dog being under the control of a finger piece 81 pivoted upon the lever 78. The lower end of the cable 24 is connected with the lever 78 and the latter engages the upper end of a brake bar 82 the lower end of which is pivotally connected as at 83 with one end of a rocker arm 84 secured to a rock shaft 85 journaled in bearings carried by a block 86 fastened to the side member of frame 1 adjacent to gear wheel 77 and below the latter. Pivoted between their ends upon the block 86 are brake shoes 87 arranged upon opposite sides of the gear wheel 77 at one side of these pivot points and normally held in non-braking position by a spring 88 secured to the other ends of said shoes. Between the shoes 87 is a cam 89 secured to the rock shaft 85 and adapted to swing the brake shoes against the action of the spring 88 to engage the gear wheel 77 and thereby immediately stop the rotation of the drum 75.

In practice, when the hand lever 78 is swung downwardly the cable 24 operates the clutches on shaft A, thereby permitting shaft A to run idle without influencing shaft B, and in the downward movement of the lever 78 the brake rod 82 is operated to rock the shaft 85 with the result that the brake shoes 87 engage the gear wheel 77 and so stop the drum 75, and all of the mechanism of the machine.

The lever 78 may also be operated automatically to throw off the power and apply the brake and for this purpose I employ, in the present instance, a lever 90 pivoted between its ends as at 91 upon the lever 78 and provided with an abutment block 92 that extends through a slot 93 in the lever 78 and is capable of movement into and out of the path of a dog 94 provided with a stud 95 extending through a slot 96 formed in a segment 97 secured to the gear wheel 77. This dog 94 is adjustable along the segment 97 to a position corresponding to the position of the opening in the drum 75 so that when the dog engages the abutment 92 on the lever 78 and the latter is swung under the action of the dog, the drum 75 will be stopped in a position with the cover 76 convenient to the operator or attendant, thus facilitating the removal of the contents of the drum.

This automatic stopping device may be thrown into and out of service, at will, by the operation of the lever 90 to move the abutment 92 into or out of the path of the dog 94 on the gear wheel 77 and constitutes one of the many important features of my invention.

From the foregoing description, taken in connection with the form of my invention that I have selected for illustrative purposes, it will be seen that I have provided a machine that may be cut into and out of service independently of other machines connected with the same source of power; wherein the washing drum and all the mechanism may be rendered idle while the main drive shaft continues to revolve, and wherein the entire mechanism and the washing drum may be brought to a stop immediately, and automatically when desired, and the drum stopped in a position that brings the cover within easy reach of the attendant.

Having thus described the invention, what is claimed as new, is:—

1. In a washing machine, a washing drum adapted for rotation in reverse directions alternately, a reversing shaft, driving connections between the said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutches for rendering said clutches active and inactive alternately, means for shifting said carriage, and shock absorbing means associated with said carriage for holding the latter against too rapid movement under the action of said shifting means.

2. In a washing machine, a washing drum adapted for rotation in reverse directions alternately, a reversing shaft, driving connections between the said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutches for rendering said clutches active and inactive alternately, means for shifting said carriage, comprising a shaft spring engaging sleeves on said carriage spaced apart in axial alinement, spring compressing sleeves within said first sleeves, respectively and encircling said last-named shaft, a spring encircling said shaft between said sleeves and under the influence of said last-named sleeves, and worm operating means for sliding said last-named sleeves.

3. In a washing machine, a washing drum adapted for rotation in reverse directions alternately, a reversing shaft, driving connections between the said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutches for rendering said clutches active and inactive alternately, means for shifting said carriage, comprising a shaft spring engaging sleeves on said carriage spaced apart in axial alinement, spring compressing sleeves within said first sleeves, respectively, and encircling said last-named shaft, a spring encircling said shaft between said sleeves and under the influence of said last-named sleeves, and worm operating means for sliding said last-named sleeves, comprising a plate interconnecting the second-named sleeves, a finger engaging in said plate, a worm nut carrying said finger, and a worm shaft for said nut.

4. In a washing machine, a washing drum adapted for rotation in reverse directions alternately, a reversing shaft, driving connection between said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutches for rendering said clutches active and inactive alternately, means for shifting said carriage alternately in reverse directions and under the control of said reversing shaft and comprising a shaft, spring engaging sleeves, said carriage spaced apart in axial alinement, spring compressing sleeves within said first-named sleeves, respectively, and encircling said last-named shaft, a spring encircling said last-named shaft between said sleeves and under the influence of said last-named sleeves, worm operated means for sliding said last-named sleeves, and means for holding said carriage against movement in the initial rotation of said reversing shaft in either direction.

5. In a washing machine, a washing drum adapted for rotation in reverse directions alternately, a reversing shaft, driving connection between said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutched for rendering said clutches active and inactive alternately, means for shifting said carriage alternately in reverse directions and under the control of said reversing shaft and comprising a shaft, spring engaging sleeves, said carriage spaced apart in axial alinement, spring compressing sleeves within said first-named sleeves, respectively, and encircling said last-named shaft, a spring encircling said last-named shaft between said sleeves and under the influence of said last-named sleeves, worm operated means for sliding said last-named sleeves, and means for holding said carriage against movement in the initial rotation of said reversing shaft in either direction and under the control of said plate.

6. In a washing machine, a washing drum adapted for rotation in reverse directions alternately, a reversing shaft, driving connection between said shaft and drum, driving elements on said shaft for driving the same, a main drive shaft, driving connections between said main drive shaft and said driving elements on said reversing shaft for driving said first-named shaft in reverse directions, clutches controlling said driving elements, a carriage mounted for longitudinal movement, connections between said carriage and clutches for rendering said clutches active and inactive alternately, means for shifting said carriage alternately in reverse directions and under the control of said reversing shaft and comprising a shaft, spring engaging sleeves, said carriage spaced apart in axial alinement, spring compressing sleeves within said first-named sleeves, respectively, and encircling said last-named shaft, a spring encircling said last-named shaft between said sleeves and under the influence of said last-named sleeves, worm operated means for sliding said last-named sleeves, and means for holding said carriage against movement in the initial rotation of said reversing shaft in either direction and under the control of said plate, and including latch bars engaging said carriage, and rollers on said plate engaging said latch bars to operate the latter to relieve the carriage of the influence thereof.

7. In a washing machine, a washing drum adapted for rotation in reverse directions alternately, a reversing shaft, driving connections between said shaft and drum, driving elements on said shaft for driving the same, a main drive shaft, driving connections between said main drive shaft and said driving elements on said reversing shaft for driving said first-named shaft in reverse directions, clutches controlling said driving elements, means for operating said clutches alternately whereby said reverse shaft may be alternately rotated in reverse directions, and shock absorbing means associated with said last-named means for holding the latter against too rapid movement to shift said clutches.

8. In a washing machine, a washing drum adapted for rotation in reverse directions alternately, a reversing shaft, driving connections between said shaft and drum, driving elements on said shaft for driving the same, a main drive shaft, driving connections between said main drive shaft and said driving elements on said reversing shaft for driving said first named shaft in reverse directions, clutches controlling said driving elements, a carriage mounted for longitudinal movement, connections between said carriages and clutches for rendering said clutches active and inactive alternately, means for shifting said carriage alternately in reverse directions and under the control of said reversing shaft, means for holding said carriage against movement in the initial rotation of said reversing shaft in either direction, means operable from said reversing shaft in the initial movement thereof in either direction to store power for operating said carriage, and means for releasing said carriage to place the carriage under the influence of said power storing means, said last named means being under the control of the power storing means, and shock absorbing means associated with said carriage for holding the latter against too rapid movement to shift said clutches.

In testimony whereof I affix my signature.

PETER MAKOWSKI.